United States Patent
Ni (10) Patent No.: US 9,427,877 B2
(45) Date of Patent: Aug. 30, 2016

(54) OPERATION BOX AND METHOD FOR REPLACING GLOVES THEREOF

(71) Applicant: SHENZHEN CHINA STAR OPTOELECTRONICS TECHNOLOGY CO., LTD., Guangdong (CN)

(72) Inventor: Kui Ni, Guangdong (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 14/408,900

(22) PCT Filed: Sep. 10, 2014

(86) PCT No.: PCT/CN2014/086218
§ 371 (c)(1),
(2) Date: Dec. 17, 2014

(87) PCT Pub. No.: WO2016/026173
PCT Pub. Date: Feb. 25, 2016

(65) Prior Publication Data
US 2016/0052150 A1    Feb. 25, 2016

(30) Foreign Application Priority Data
Aug. 21, 2014  (CN) .......................... 2014 1 0416440

(51) Int. Cl.
*B25J 21/02*          (2006.01)
(52) U.S. Cl.
CPC .................................... *B25J 21/02* (2013.01)

(58) Field of Classification Search
CPC ...................................................... B25J 21/02
USPC ............................................................ 312/1
See application file for complete search history.

(56) References Cited

U.S. PATENT DOCUMENTS 3,267,830 A * 8/1966 Van Gaasbeek ......... B25J 21/02
                                                         2/270
3,475,808 A * 11/1969 Woolsey ................... B25J 21/02
                                                       250/516.1
(Continued)

FOREIGN PATENT DOCUMENTS

CN          102015224 A       4/2011
CN          202498551 U      10/2012
(Continued)

OTHER PUBLICATIONS

Office Action issued in corresponding Chinese Application No. 201410416440.5 dated Jul. 29, 2015 (7 pages).

*Primary Examiner* — Daniel Rohrhoff
(74) *Attorney, Agent, or Firm* — Osha Liang LLP (57) ABSTRACT

A method for replacing an operation box and gloves for the same is provided, the operation box comprises a housing, a glove, a first sealing member, a second sealing member and a cover plate; the housing comprises a chamber, at least one operation window disposed on a side wall of the housing; the first sealing member is configured to seal the glove outlet edge portion and the side wall; the second sealing member is disposed on an inner surface of the side wall of the housing; the cover plate is disposed inside the chamber, the cover plate and the second sealing member are configured to jointly seal the operation window.

18 Claims, 8 Drawing Sheets

(56) References Cited

U.S. PATENT DOCUMENTS

| | | | | |
|---|---|---|---|---|
| 4,141,609 | A | * | 2/1979 | Eisert .................. G21F 7/047 312/1 |
| 5,090,782 | A | * | 2/1992 | Glachet ................ G21F 7/053 312/1 |
| 5,299,243 | A | | 3/1994 | Picco |
| 5,662,581 | A | * | 9/1997 | Jennrich .............. G21F 7/053 312/1 |
| 7,780,248 | B2 | * | 8/2010 | Granadino ........... G01M 3/226 312/1 |
| 2005/0217102 | A1 | * | 10/2005 | Glachet ................ B01L 1/02 29/454 |
| 2010/0186191 | A1 | * | 7/2010 | Mares .................. B25J 21/02 16/2.1 |
| 2011/0067217 | A1 | | 3/2011 | Giesen |
| 2014/0163326 | A1 | * | 6/2014 | Forsell ............... A61B 17/3423 600/207 |
| 2015/0059144 | A1 | * | 3/2015 | Fournier .............. B25J 21/02 29/407.08 |

FOREIGN PATENT DOCUMENTS

| | | |
|---|---|---|
| DE | 102006043686 A1 | 3/2008 |
| EP | 0549450 A1 | 6/1993 |
| WO | 03057431 A1 | 7/2003 |

\* cited by examiner

OPERATION BOX AND METHOD FOR REPLACING GLOVES THEREOF

FIELD OF THE INVENTION

The present invention relates to a manufacturing apparatus for display panels, and more particularly, to an operation box and a method for replacing gloves thereof.

BACKGROUND OF THE INVENTION

Partial conventional manufacturing procedures for Organic Light Emitting Diode (OLED) display panels needs to operate in an operation box which must remain sealed to prevent the gas environment from being damaged.

The operation box is further disposed with gloves because the gloves are needed to implement the aforementioned manufacturing procedure.

However, the gloves will be aged or damaged after used for a time period and need replaced.

Commonly, a conventional solution for replacing the gloves of the operation box includes the following steps of: removing the gloves from the operation box by replacing with new gloves, and then resealing the operation box and replacing the gases inside the operation box so as to make the gas environment of the operation box in compliance with the requirements of the manufacturing procedure.

The aforementioned technical solution needs to recover the gas environment inside the operation box, which is suitable for the manufacturing procedure condition. This process does not only spend costly but also takes more than 6 hours, even up to 8 hours.

Thus, it is necessary to propose a new technical solution to solve these technical problems.

SUMMARY OF THE INVENTION

An objective of the present invention is to provide an operation box and a method for replacing gloves thereof, which is capable of maintaining a chamber of the operation box in a sealed state during a process of replacing the gloves, and further preventing the gas environment of the chamber from being damaged, thereby reducing both costs and the time required for the process.

In order to achieve the aforementioned objective of the present invention, the present invention provides a technical solution as follows.

An operation box, comprises: a housing comprising a chamber, and at least one operation window disposed on a side wall of the housing; at least one glove comprising a glove body and a glove outlet edge portion; at least one first sealing member disposed on the operation window and located on an outer surface of the side wall of the housing, the glove outlet edge portion of the glove being disposed between the first sealing member and the side wall, the first sealing member being configured to seal the glove outlet edge portion and the side wall; at least one second sealing member disposed on the operation window and located on an inner surface of the side wall of the housing; and at least one cover plate disposed in the chamber, the cover plate and the second sealing member being configured to jointly seal the operation window; the first sealing member having a first through hole which is located on the first sealing member at a position corresponding to the operation window; the second sealing member having a second through hole which is located on the second sealing member at a position corresponding to the operation window; the cover plate being configured to cover the second through hole; the operation box further comprising: a fixing member for fixing the first sealing member on the outer surface of the side wall and for unfixing the first sealing member from the outer surface of the side wall.

In the operation box described above, the cover plate comprises a main cover plate and a latching member disposed on the main cover plate. The latching member is configured to latch the second sealing member mutually and positions the main cover plate and the second sealing member in close contact.

In the operation box described above, a sealing element is disposed on the main cover plate or the second sealing member. A first latching portion is disposed on the latching member, a second latching portion is disposed on the second sealing member; a position where the first latching portion is located on the latching member corresponds to a position where the second latching portion is located on the second sealing member. The first latching portion is configured to latch the second latching portion mutually and makes the main cover plate and the second sealing member jointly squeeze the sealing element for sealing the chamber.

The present invention further provides an operation box, comprising: a housing comprising a chamber, and at least one operation window disposed on a side wall of the housing; at least one glove comprising a glove body and a glove outlet edge portion; at least one first sealing member disposed on the operation window and located on an outer surface of the side wall of the housing, the glove outlet edge portion of the glove being disposed between the first sealing member and the side wall, the first sealing member being configured to seal the glove outlet edge portion and the side wall; at least one second sealing member disposed on the operation window and located on an inner surface of the side wall of the housing; and at least one cover plate disposed in the chamber, the cover plate and the second sealing member being configured to jointly seal the operation window.

In the operation box described above, the first sealing member has a first through hole which is located on the first sealing member at a position corresponding to the operation window. The second sealing member has a second through hole; which is located on the second sealing member at a position corresponding to the operation window. The cover plate is configured to cover the second through hole.

In the operation box described above, the operation box further comprises a fixing member for fixing the first sealing member on the outer surface of the side wall and for unfixing the first sealing member from the outer surface of the side wall.

In the operation box described above, the fixing member is a screw, the screw is configured to fix the first sealing member on the outer surface of the side wall by a tightening manner and release the first sealing member fixed on the side wall by an unscrewing manner.

In the operation box described above, the fixing member is a first spring buckle. One end portion of the first spring buckle is fixed on the outer surface of the side wall, the other end portion of the first spring buckle has a first sprocket. The first spring buckle is configured to withhold the first seal member by the first sprocket so that the first sealing member is fixed on the outer surface of the side wall. The first spring buckle is further configured to release a buckling state between the first spring buckle and the first seal member by releasing with the first sprocket, for releasing the first sealing member from being fixed on the side wall.

In the operation box described above, the cover plate further comprises a main cover plate and a latching member disposed on the main cover plate. The latching member is configured to latch the second sealing member mutually and positions the main cover plate and the second sealing member in close contact.

In the operation box described above, a sealing element is disposed on the main cover plate or the second sealing member. A first latching portion is disposed on the latching member, a second latching portion is disposed on the second sealing member; a position where the first latching portion is located on the latching member corresponds to a position where the second latching portion is located on the second sealing member. The first latching portion is configured to latch the second latching portion mutually and makes the main cover plate and the second sealing member jointly squeeze the sealing element for sealing the chamber.

In the operation box described above, the latching member is a sub cover plate, the first latching portion is a locking wing, and the second latching portion is a locking recess. The locking wing is configured to embed into the locking recess, and an embedding opening is disposed on a second surface of the second sealing member and corresponds to the locking wing; the embedding opening is throughout the locking recess. The locking wing is configured to embed into the locking recess by the embedding opening; the locking recess is used for accommodating the locking wing. The latching member rotates a predetermined angle along a first direction or a direction opposite the first direction after embedding into the locking recess so that the locking wing and the locking recess mutually lock. The latching member further rotates the predetermined angle along the first direction or a direction opposite the first direction for unlocking the locking wing and the locking recess.

In the operation box described above, the first latching portion is a second spring buckle or a second spring buckle recess, the second latching portion is the second spring buckle recess or the second spring buckle, and the cover plate and the second sealing member are configured to seal the operation window by the second spring buckle and the second spring buckle recess mutually buckling. The second spring buckle or the second spring buckle recess on the cover plate and the second spring buckle recess or the second spring buckle of the second sealing member are further used for unlocking so that the cover plate and the second sealing member separate from each other for releasing the operation window from sealing.

In the operation box described above, a recess is disposed on the main cover plate or the second sealing member. The recess is used for accommodating and fixing the sealing element.

In the operation box described above, the cover plate further comprises a gripping member which is disposed on the sub cover plate.

In the operation box described above, the cover plate further comprises a connecting member which is used for connecting the main cover plate with the latching member.

The present invention further provides a method for replacing a glove of an operation box comprising the following steps of; using the cover plate and the second sealing member to jointly seal the operation window; unlocking the first sealing member from the outer surface of the side wall so that the glove separates from the side wall; disposing a glove outlet edge portion of the other glove on the outer surface of the side wall; fixing the first sealing member on the outer surface of the side wall for sealing the glove outlet edge portion of the other glove and the side wall; releasing the operation window from sealing of the cover plate and the second sealing member.

In the method for replacing the glove of the operation box described above, the step of using the cover plate and the second sealing member to jointly seal the operation window comprises: moving the cover plate to the operation window by the glove body, wherein the cover plate is located in the chamber; using the cover plate for covering the second sealing member, wherein the latching member of the cover plate is disposed toward the operation window; latching the first latching portion of the latching member with the second latching portion of the second sealing member so that the main cover plate and the second sealing member jointly squeeze the sealing element for sealing the chamber.

In the method for replacing the glove of the operation box described above, after the step of latching the first latching portion of the latching member with the second latching portion of the second sealing member, and before the step of unfixing the first sealing member from the outer surface of the side wall, the method further comprises the following step of: removing the glove body from the operation window.

In the method for replacing the glove of the operation box described above, the step of releasing the operation window from sealing of the cover plate and the second sealing member comprises: releasing a latching of the first latching portion of the latching member and the second latching portion of the second sealing member by the glove body of the other glove; disposing the cover plate in the chamber by the glove body of the other glove.

In the method for replacing the glove of the operation box described above, after the step of fixing the first sealing member on the outer surface of the side wall, and before the step of releasing the latching of the first latching portion of the latching member and the second latching portion of the second sealing member by the glove body of the other glove, the method further comprises the following step of: moving the glove body of the other glove to the operation window.

Relative to the conventional method, the present invention can maintain a chamber of the operation box in a sealed state during the process of replacing the gloves, and can prevent the gas environment (such as $N_2$) of the chamber from being destroyed, thereby reducing both costs and the time requirements of the process.

The following embodiments and drawings are made for the purpose of illustrating the general principles of the present invention and are used to describe and understand the present invention.

DETAILED DESCRIPTION OF THE PREFERRED EMBODIMENTS

The preferred embodiments adopted by the present invention are given in the following detailed description, with reference to the drawings.

The terminology used herein is only for describing particular example, embodiments or application and is not intended to limit. As used herein, the singular forms "a", "an", and "the" may be intended to include one or more items or the plural forms in both the claims and the specification of the present invention, unless the context clearly indicates otherwise.

Figure 1:
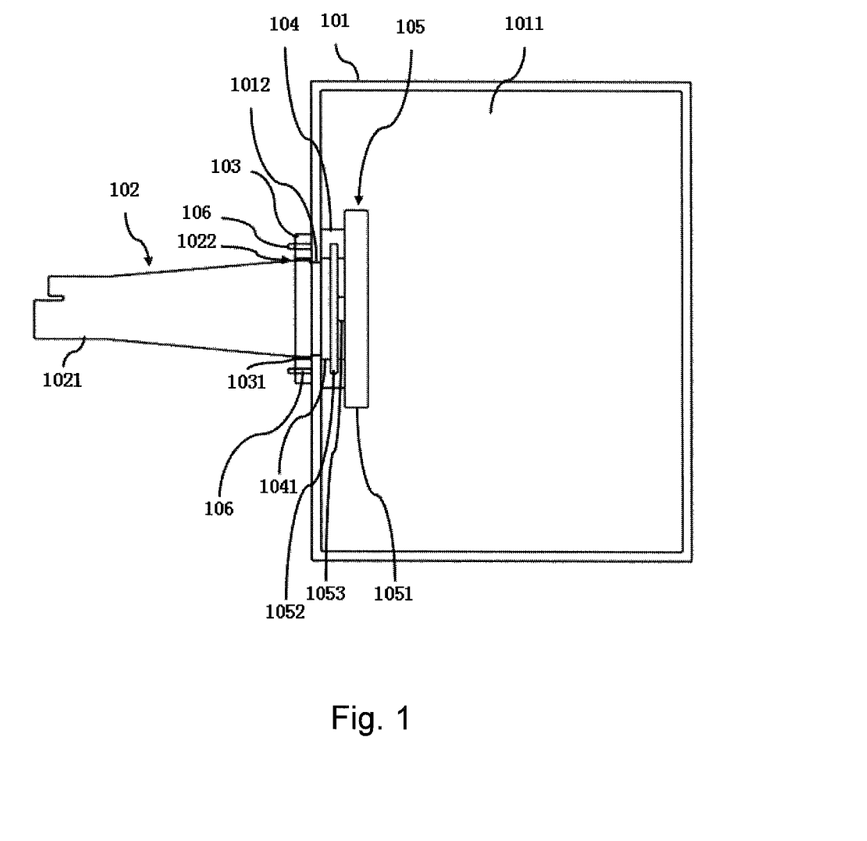
FIG. 1 is a schematic view of an operation box according to a first embodiment of the present invention.
Figure 2:
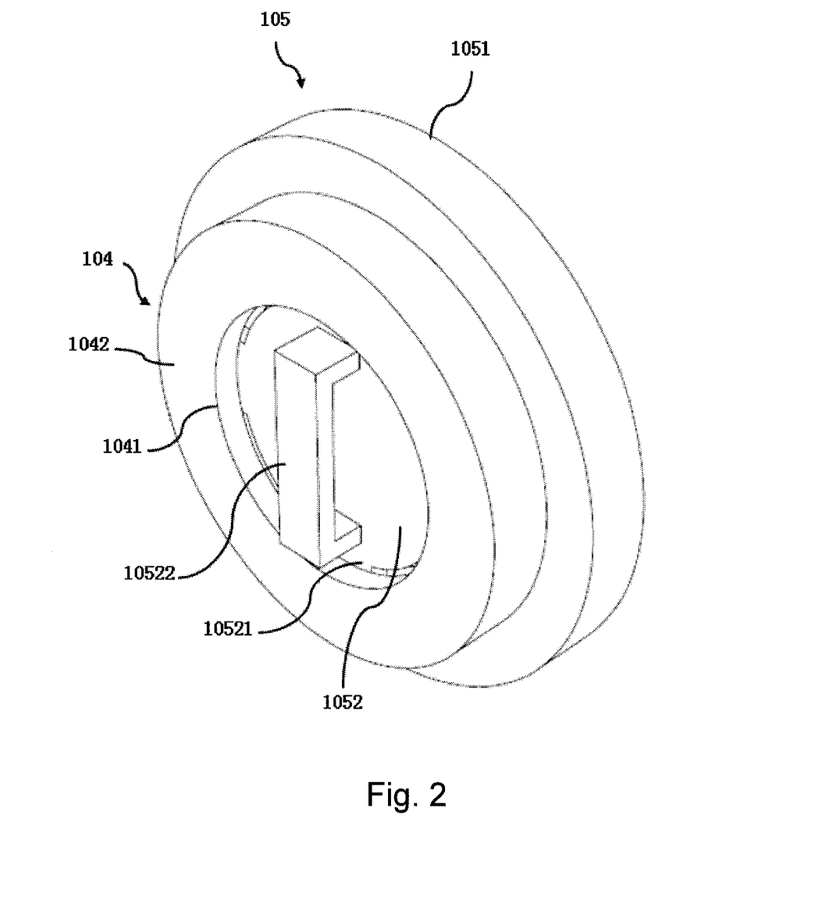
FIG. 2 is an isometric view of a cover plate assembled with a second sealing member according to FIG. 1.
Figure 3:
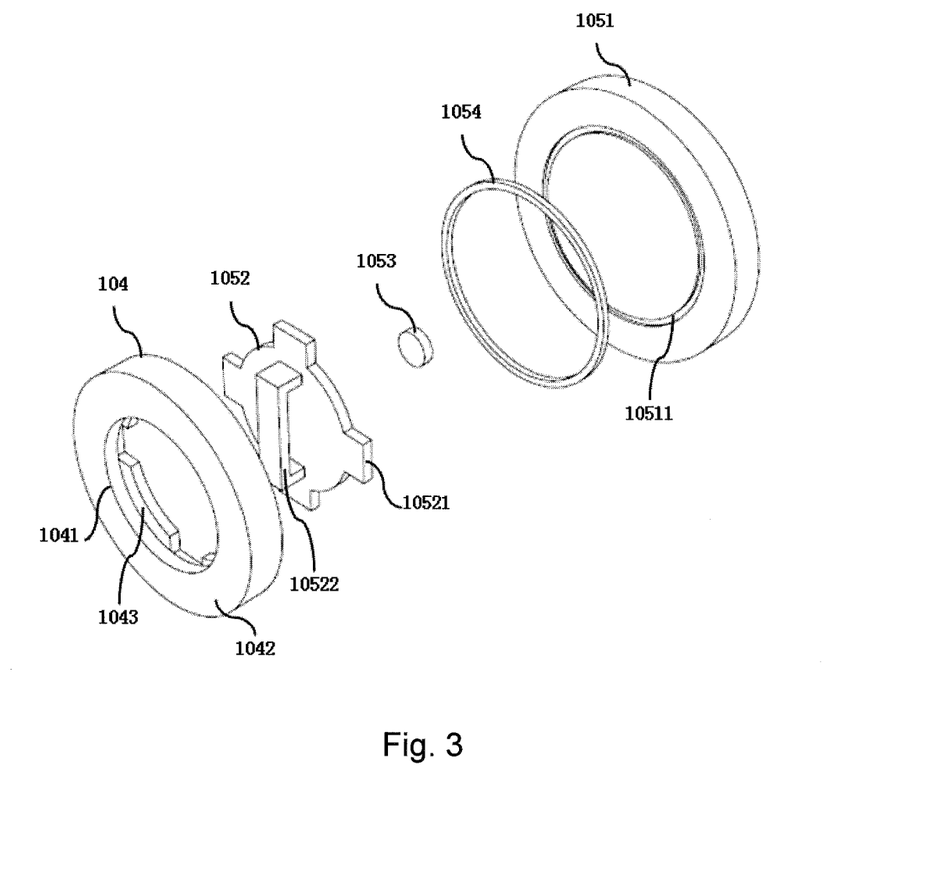
FIG. 3 is an exploded view of the cover plate assembled with the second sealing member according to FIG. 2.

Referring to FIGS. 1-3, FIG. 1 depicts a schematic view of an operation box according to a first embodiment of the present invention, FIG. 2 depicts an isometric view of a cover plate 105 assembled with a second sealing member 104 according to FIG. 1, and FIG. 3 depicts an exploded view of the cover plate 105 assembled with the second sealing member 104 according to FIG. 2 of.

In this embodiment of the present invention, an operation box comprising a housing 101, a glove 102, a first sealing member 103, the second sealing member 104, and the cover plate 105 is provided.

The housing 101 comprises a chamber 1011 and at least one operation window 1012 disposed on a side wall of the housing 101. For example, two operation windows 1012 are disposed on the side wall of the housing 101.

The glove 102 comprises a glove body 1021 and a glove outlet edge portion 1022. The glove 102 is provided for a user's (operator) working in the chamber 1011. The glove 102 is further used for sealing the operation window 1012. Specifically, the glove 102 has a semi-closed space inside thereof, with an opening located at a glove outlet of the glove 102. The glove outlet of the glove 102 corresponds to a position where the operation window 1012 is located. Namely, the operation window 1012 is disposed within a range corresponding to the glove outlet. The semi-closed space surrounds the operation window 1012.

A first sealing member 103 is disposed at the operation window 1012 and located on an outer surface of the side wall of the housing 101. The first sealing member 103 surrounds the operation window 1012. Specifically, the first sealing member 103 has a first through hole 1031 which is located on the first sealing member 103 at a position corresponding to the operation window 1012. The glove outlet edge portion 1022 of the glove 102 is disposed between the first sealing member 103 and the side wall. The first sealing member 103 is configured to seal the glove outlet edge portion 1022 and the side wall. Specifically, the first sealing member 103 is configured to press the glove outlet edge portion 1022 on the side wall for sealing the operation window 1012 by the glove outlet edge portion 1022 of the glove 102. The first sealing member 103 further unseals the glove outlet edge portion 1022 and the side wall. Specifically, the first sealing member 103 is also used for unsealing the glove outlet edge portion 1022 and the side wall after the first sealing member 103 is disparted from the side wall.

The second sealing member 104 disposed on the operation window 1012 and is located on an inner surface of the side wall of the housing 101. The second sealing member 103 surrounds the operation window 1012. Specifically, the second sealing member 104 has a second through hole 1041 which is located on the second sealing member 104 at a position corresponding to the operation window 1012. The second sealing member 104 has a first surface 1042 and a second surface. The first surface 1042 is in close contact with the inner surface of the side wall, and the second surface is used for contacting the cover plate 105/a sealing element 1054.

The cover plate 105 is disposed in the chamber 1011, and the cover plate 105 is configured to cover the second through hole 1041. Particularly, the cover plate 105 is used for covering the second through hole 1041 while the glove 102 needs to be replaced, and for removing the cover plate 105 from the second through hole 1041 when the glove 102 has been replaced. The cover plate 105 and the second sealing member 104 are configured to jointly seal the operation window 102. Before there is a need to replace the glove 102 or after replacing the glove 102, the cover plate 105 can be suspended within the chamber 1011, and can also be placed in the bottom of the chamber 1011 or elsewhere, and further can connect with an inner wall of the chamber 1011 by a moveable connection member. The moveable connection member can be a mechanical arm, hinges, and so on.

In this embodiment of the present invention, the operation box further comprises a fixing member 106 for fixing the first sealing member 103 on the outer surface of the side wall and for unfixing the first sealing member 103 from the outer surface of the side wall. Specifically, the fixing member 106 can be a screw, the screw is configured to fix the first sealing member 103 on the outer surface of the side wall in a tightening manner and release the first sealing member 103 fixed on the side wall in an unscrewing manner. The fixing member 103 also can be a first spring buckle. One end portion of the first spring buckle is fixed on the outer surface of the side wall, the other end portion of the first spring buckle has a first sprocket. The first spring buckle is configured to withhold the first seal member 103 by the first sprocket so that the first sealing member 103 is fixed on the outer surface of the side wall. The first spring buckle is further configured to release a buckling state between the first spring buckle and the first seal member 103 by releasing with the first sprocket, for releasing the first sealing member 103 from being fixed on the side wall.

In this embodiment of the present invention, the cover plate 105 further comprises a main cover plate 1051 and a latching member 1052. The latching member 1052 is disposed on the main cover plate 1051, which is configured to latch the second sealing member 104, mutually, and positions the main cover plate 1051 in close contact with the second sealing member 104. The main cover plate 1051 is used for contacting with the second sealing member 104, and for covering of the second through hole 1041 of the second sealing member 104.

In this embodiment of the present invention, the cover plate 105 further comprises a connecting member 1053 which is used for connecting the main cover plate 1051 with the latching member 1052. The connecting member 1053 is a spring or a connecting rod.

In this embodiment of the present invention, a sealing element 1054 is disposed on the main cover plate 1051 or the second sealing member 104. Namely, when the sealing element 1054 is in contact with the main plate 1051 and the second seal member 104 (the main cover plate 1051 is in a manner of covering the second seal member 104), the sealing element 1054 is located between the main plate 1051 and the second seal member 104. The sealing element 1054 is annular-shaped. Specifically, the sealing element 1054 is a sealing ring, and the sealing ring comprises a rubber strip.

A first latching portion is disposed on the latching member 1052, a second latching portion is disposed on the second sealing member 104, and a position where the first latching portion is located on the latching member 1052 corresponds to a position where the second latching portion is located on the second sealing member 104. The first latching portion is configured to latch the second latching portion, mutually and makes the main cover plate 1051 and the second sealing member 104 to jointly squeeze the sealing element 1054 for sealing the chamber 1011.

Figure 4:
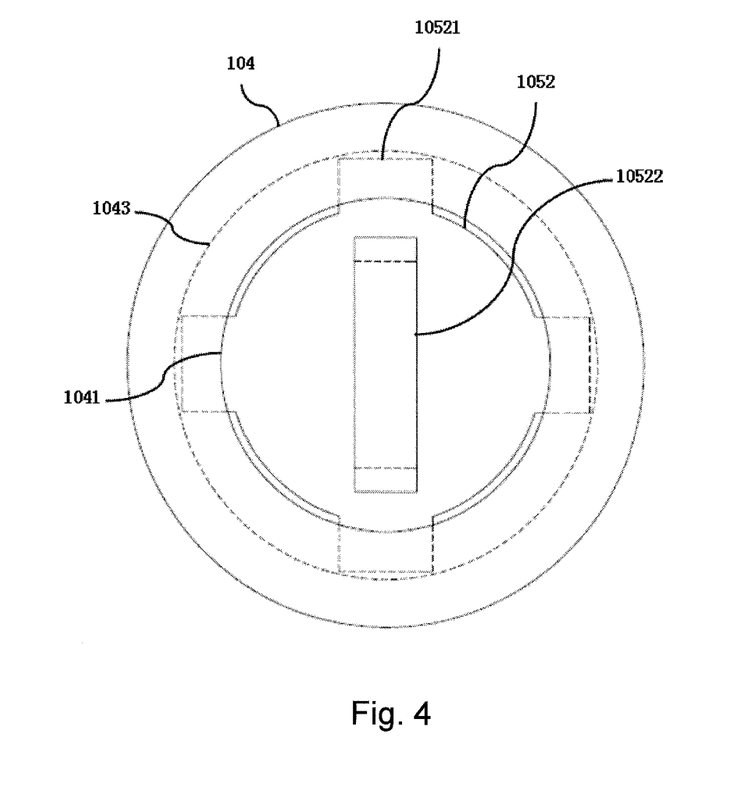
FIGS. 4 and 5 are schematic views in a manner of the latching member mutually latching with the second sealing member according to FIG. 2.
Figure 5:
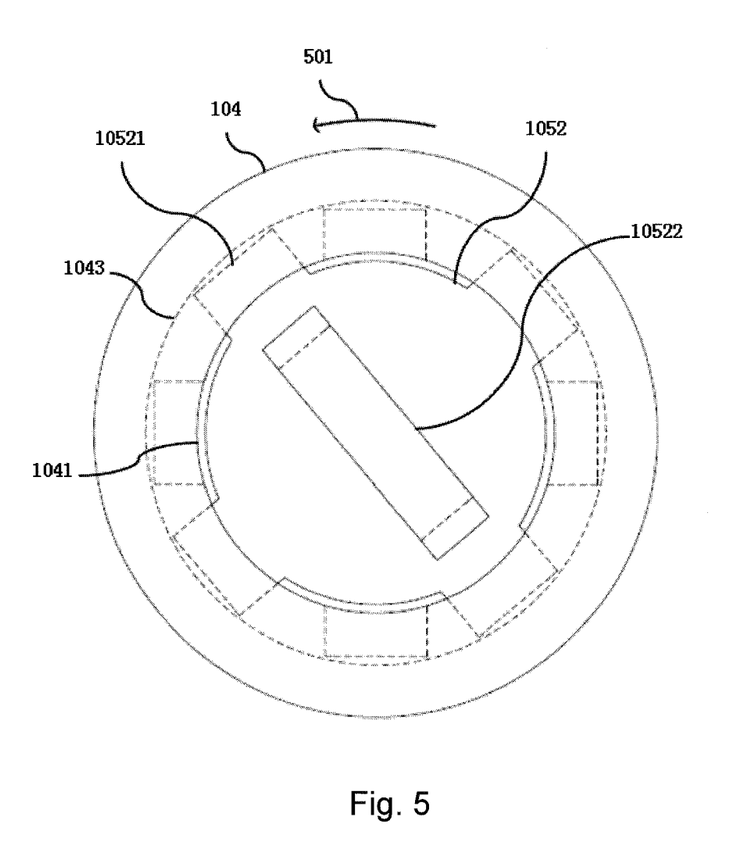

Referring to FIGS. 4&5, FIGS. 4 and 5 are schematic views in a manner of the latching member mutually latching with the second sealing member according to FIG. 2.

The latching member 1052 is a sub cover plate, the first latching portion is a locking wing 10521, and the second latching portion is a locking recess 1043. The locking wing 10521 is configured to embed into the locking recess 1043, and an embedding opening is disposed on a second surface of the second sealing member 104 and corresponds to the locking wing 10521. The locking recess 1043 has an embedding opening throughout therein. Namely, the embedding opening is connected to the locking recess 1043, and the locking wing 10521 is configured to embed into the locking recess 1043 by the embedding opening. The locking recess 1043 is used for accommodating the locking wing 10521. The latching member 1052 (the sub cover plate/the locking wing 10521) rotates a predetermined angle along a first direction 501 or a direction opposite to the first direction 501 after embedding into the locking recess, referring to FIG. 5, so that the locking wing 10521 and the locking recess 1043 are mutually locked. Namely, the cover plate 105 (the latching member 1052) and the second sealing member 104 are configured to seal the operation window 1012 by mutually locking the locking wing 10521 and the locking recess 1043. Furthermore, as an alternative solution, the first latching portion is a second spring buckle and the second latching portion is a second spring buckle recess, or the first latching portion is the second spring buckle recess and the second latching portion is the second spring buckle. The cover plate 105 and the second sealing member 104 are configured to seal the operation window 1012 by the second spring buckle and the second spring buckle recess mutually buckling.

The latching member 1052 (the sub cover plate/the locking wing 10521) further rotates the predetermined angle along the first direction 501 or the direction opposite to the first direction 501 for unlocking the locking wing 10521 and the locking recess 1043. That is, the cover plate 105 (the latching member 1052) and the second sealing member 104 are used for unlocking with the locking wing 10521 and the locking recess 1043 so as to release the operation window 1012 from sealing.

The second spring buckle or a second spring buckle recess on the cover plate 105 (the latching member 1052) and the second spring buckle recess or the second spring buckle of the second sealing member 104 are further used for unlocking so that the cover plate 105 and the second sealing member 104 are separated from each other for releasing the operation window 1012 from sealing.

In this embodiment of the present invention, a recess 10511 is disposed on the main cover plate 1051 or the second sealing member 104 and used for accommodating and fixing the sealing element 1054 (the sealing ring).

In this embodiment of the present invention, the cover plate 105 further comprises a gripping member 10522. The gripping member 10522 is disposed on the latching member 1052. Specifically, the gripping member 10522 is disposed on the sub cover plate, and can be a handle and so on.

According to the above technical solutions, the present invention can maintain the chamber 1011 of the operation box in a sealed state during the process of replacing the glove 102. Furthermore, it can prevent the gas environment (such as $N_2$) of the chamber 1011 from being destroyed, and reduces both costs and the time requirements of the process (after the chamber 1011 had been opened, the process of restoring the gas environment inside the operation box suitable for the manufacturing procedure state is not only costly, but also takes more than six hours, but can require more than eight hours).

Figure 6:
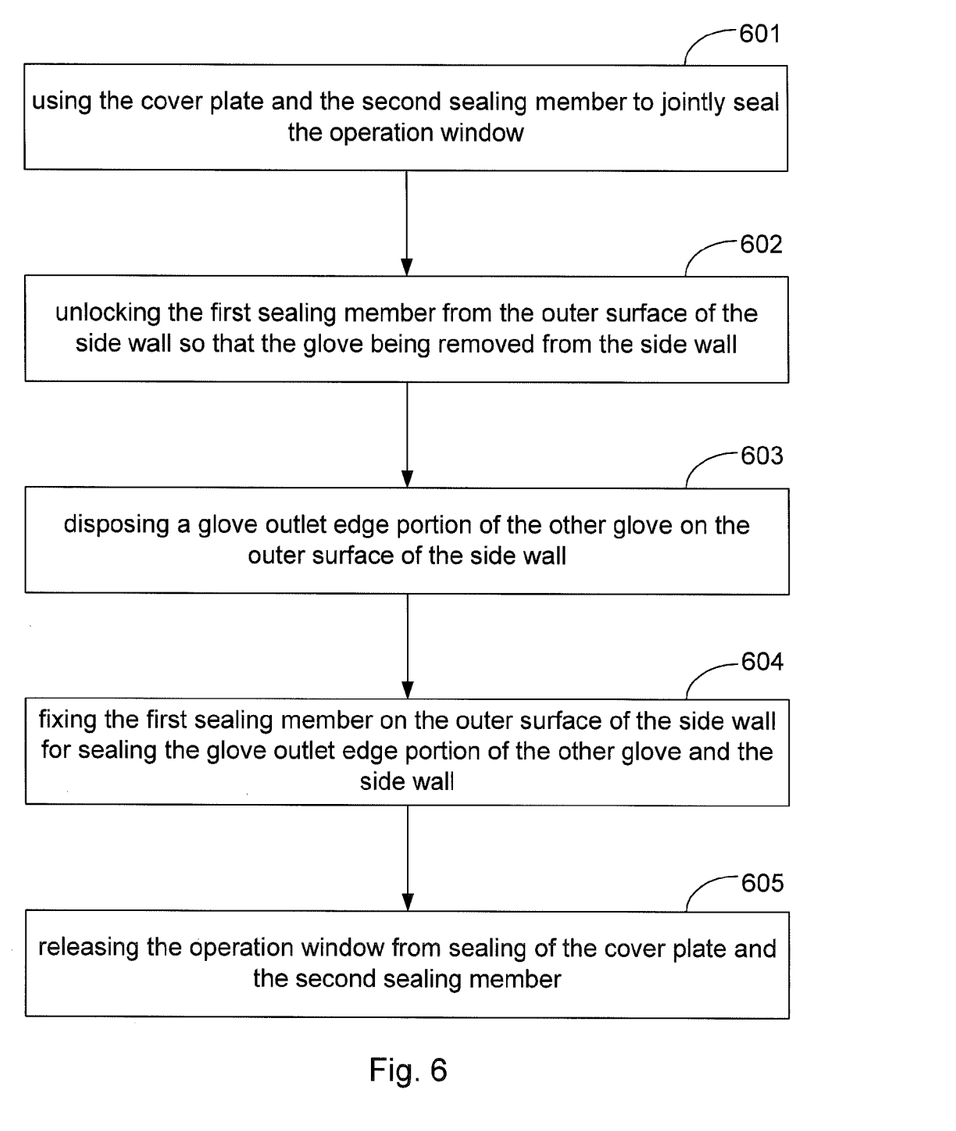
FIG. 6 is a flowchart of a method for replacing a glove of an operation box according to the first embodiment of the present invention.

FIG. 6 is a flowchart of a method for replacing a glove of an operation box according to the first embodiment of the present invention. The method for replacing the glove of an operation box according to the embodiment is based on the operation box according to the embodiment. The method for replacing a glove of an operation box further comprises the following steps of:

In step 601, using the cover plate 105 and the second sealing member 104 to jointly seal the operation window 1012;

In step 602, unlocking the first sealing member 103 from the outer surface of the side wall so that the glove 102 is removed from the side wall; Specifically, unfixing the first sealing member 103 from the outer surface of the side wall through the fixing member 106; for example, releasing the first sealing member 103 fixed on the side wall by an unscrewing manner makes the screw separate from the side wall; furthermore, the fixing member 106 being further configured to release a buckling state between the first spring buckle and a first spring buckle recess for releasing the first sealing member fixed on the side wall.

Figure 7:
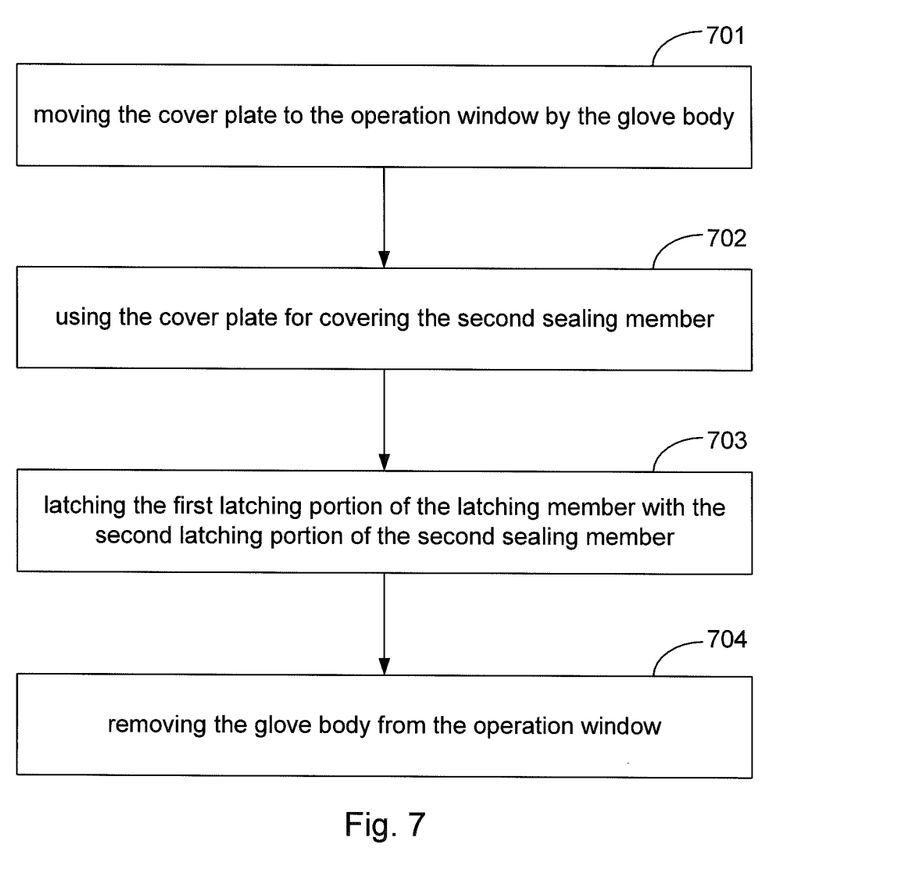
FIG. 7 is a flowchart of the step of the cover plate and the second sealing member jointly sealing the operation window according to FIG. 6.
Figure 8:
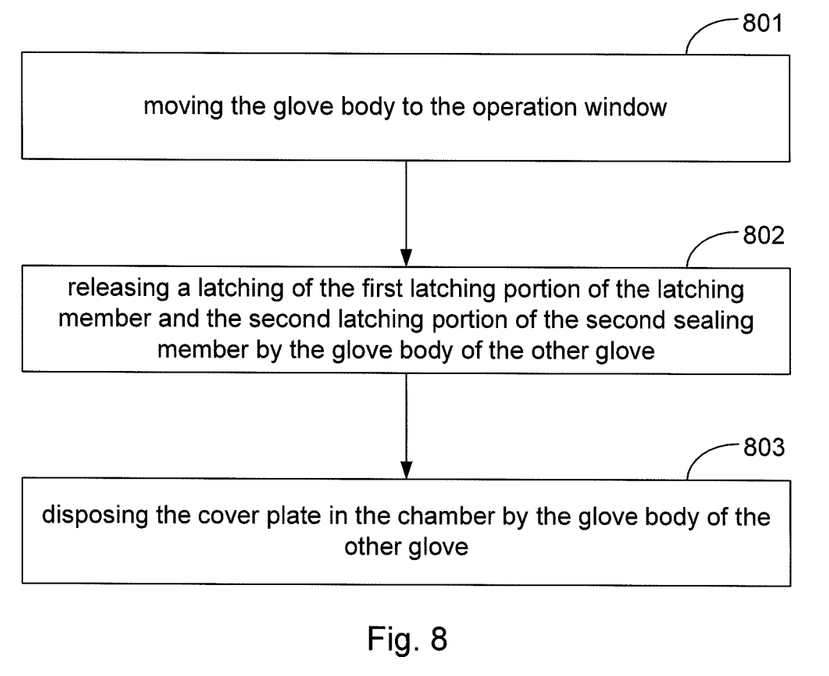
FIG. 8 is a flowchart of the step of the cover plate and the second sealing member unsealing the operation window according to FIG. 6.

In step 603, disposing a glove outlet edge portion of the other glove on the outer surface of the side wall;

In step 604, fixing the first sealing member on the outer surface of the side wall for sealing the glove outlet edge portion of the other glove and the side wall; Specifically, the first sealing member 103 being fixed together with the side wall through the fixing member 106; for example, the first sealing member 103 being fixed on the outer surface of the side wall in a tightening manner such that the first sealing member 103 is fixed to the side wall; furthermore, the first spring buckle and the first spring buckle recess being mutually buckled so that the first sealing member 103 is fixed to the side wall;

In step 605, releasing the operation window from sealing of the cover plate and the second sealing member;

The method for replacing the glove of the operation box according to the second embodiment of the present invention is similar to the first embodiment mentioned above, except that:

The step (that is the step 601) of using the cover plate 105 and the second sealing member 104 to jointly seal the operation window 1012 comprises:

In step 701, moving the cover plate 105 to the operation window 1012 by the glove body 1021 and the cover plate 105 located in the chamber 1011; specifically, the cover plate 105 being moved to the operation window 1012 through gripping the grip member 10522 by the glove body 1021 and then pulling the cover plate 105 by the grip member 10522;

In step 702, using the cover plate 105 for covering the second sealing member 104, wherein the latching member 1052 of the cover plate 105 is disposed toward the operation window 1012; specifically, the second through hole 1041 being covered through gripping the grip member 10522 by the glove body 1021 and then pulling the latching member 1052 by the grip member 10522, and further pulling the main cover plate 1051 of the cover plate 105 to move toward the operation window 1012;

In step 703, latching the first latching portion of the latching member 1052 with the second latching portion of the second sealing member 104 so that the main cover plate 1051 and the second sealing member 104 jointly squeeze the sealing element 1054 for sealing the chamber 1011; specifically, the first latching portion of the latching member 1052 being latched with the second latching portion of the second sealing member 104 so that the main cover plate 1051 and the second sealing member 104 jointly squeeze the sealing element 1054, and further the main cover plate 1051 and the second sealing member 104 jointly sealing the operation window 1012 (the chamber 1011), wherein the step of latching the first latching portion of the latching member 1052 with the second latching portion of the second sealing member 104 comprises:

embedding the locking wing 10521 into the locking recess 1043 of the second sealing member 104 through a embedding opening disposed on a second surface of the second sealing member, rotating the latching member 1052 (the sub cover plate) the predetermined angle along a first direction 501 or the direction opposite to the first direction 501, as shown in FIG. 5, for locking the locking wing 10521 with the locking recess 1043, or the cover plate 105 and the second sealing member 104 being mutually buckling by the second spring buckle/the second spring buckle recess of the cover plate 105 (the latching member 1052) or the second spring buckle recess/the second spring buckle of the second sealing member 104;

In step 704, removing the glove body 1021 from the operation window 1012;

Furthermore, in this embodiment of the present invention, the method further comprises the following steps after the step 701 and before the step 702:

aligning the cover plate 105 with the second sealing member 104; specifically, the first latching portion of the latching member 1052 of the cover plate 105 being aligned with the second latching portion of the second sealing member 104;

The method for replacing the glove of the operation box according to the third embodiment of the present invention is similar to the first embodiment or the second embodiment mentioned above, except that:

the step of releasing the operation window 1012 from sealing of the cover plate 105 and the second sealing member 104 comprises:

in step 801, removing the glove body of the other glove to the operation window;

In step 802, releasing a latching of the first latching portion of the latching member and the second latching portion of the second sealing member by the glove body of the other glove; specifically, the latching member 1052 (the sub cover plate) rotating the predetermined angle along a first direction 501 or the direction opposite to the first direction 501 so that the locking wing 10521 and the locking recess 1043 release from locking to pull the latching member 1052 (the sub cover plate) for the latching member 1052 (the sub cover plate) removing from the embedding opening; alternatively, the second spring buckle/the second spring buckle recess on the cover plate 105 (the latching member 1052) and the second spring buckle recess/the second spring buckle of the second sealing member 104 being further used for unlocking so that the cover plate 105 and the second sealing member 105 separate from each other;

In step 803, disposing the cover plate in the chamber by the glove body of the other glove;

According to the above technical solutions, the present invention can maintain the chamber 1011 of the operation box in a sealed state during the process of replacing the glove 102, and further can prevent the gas environment (such as $N_2$) of the chamber 1011 from being destroyed, thereby reducing both costs and the time requirements of the process (after the chamber 1011 had been opened, the process of restoring the gas environment inside the operation box suitable for the manufacturing procedure state is not only takes costly, but also takes more than 6 hours, but can require more than eight hours).

Although the present invention has been described with one or more preferred embodiments thereof, those skilled in the art will appreciate that various modifications, additions, and substitutions are possible, without departing from the scope and the spirit of the invention. Accordingly, the scope of the present invention is intended to be defined only by reference to the claims. In particular, with regard to the various functions performed by the above-described components, the terms used to describe such components are intended to execute the function corresponding to the specified component (e.g., functionally equivalent) of any component (unless otherwise indicated), even if the structures and functions are not the same as the structures and functions shown in an exemplary embodiment of the present invention. Additionally, although a specific feature of the present invention has been disclosed by one of the several prior arts, specific features of the present invention can combine with one or more different features of other embodiments which are desired and advantageous to a specific or a particular application. Moreover, the term "comprising" and its derivatives as used herein are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having", and their derivatives.

As described above, the present invention has been described with a preferred embodiment thereof and it is understood that many changes and modifications to the described embodiment can be carried out without departing from the scope and the spirit of the invention that is intended to be limited only by the appended claims.

What is claimed is:

1. An operation box, comprising:
   a housing comprising a chamber, and at least one operation window disposed on a side wall of the housing;
   at least one glove which comprising a glove body and a glove outlet edge portion;
   at least one first sealing member disposed on the operation window and located on an outer surface of the side wall of the housing, the glove outlet edge portion of the glove being disposed between the first seating member and the side wall, the first sealing member being configured to seal the glove outlet edge portion and the side wall;
   at least one second sealing member disposed on the operation window and located on an inner surface of the side wall of the housing; and
   at least one cover plate disposed in the chamber, the cover plate and the second sealing member being configured to jointly seal the operation window;

the first sealing member having a first through hole which is located on the first sealing member at a position corresponding to the operation window;

the second sealing member having a second through hole which is located on the second sealing member at a position corresponding to the operation window;

the cover plate being configured to cover the second through hole, the cover plate comprising:

a main cover plate; and a latching member disposed on the main cover plate and configured to latch the second sealing member mutually and positioning the main cover plate and the second sealing member be in close contact;

the operation box further comprising:

a fixing member for fixing the first sealing member on the outer surface of the side wall and for unfixing the first sealing member from the outer surface of the side wall.

2. The operation box according to claim 1, wherein a sealing element is disposed on the main cover plate or the second sealing member;

a first latching portion is disposed on the latching member, a second latching portion is disposed on the second sealing member, a position where the first latching portion is located on the latching member corresponds to a position where the second latching portion is located on the second sealing member;

the first latching portion is configured to latch the second latching portion mutually and makes the main cover plate and the second sealing member jointly squeeze the sealing element for sealing the chamber.

3. An operation box, comprising:

a housing comprising a chamber, and at least one operation window disposed on a side wall of the housing;

at least one glove which comprising a glove body and a glove outlet edge portion;

at least one first sealing member disposed on the operation window and located on an outer surface of the side wall of the housing, the glove outlet edge portion of the glove being disposed between the first sealing member and the side wall, the first sealing member being configured to seal the glove outlet edge portion and the side wall;

at least one second sealing member disposed on the operation window and located on an inner surface of the side wall of the housing; and at least one cover plate disposed in the chamber, the cover plate and the second sealing member being configured to jointly seal the operation window, the cover plate further comprising:

a main cover plate; and a latching member being disposed on the main cover plate, the latching member being configured to latch the second sealing member mutually and positioning the main cover plate and the second sealing member in close contact.

4. The operation box according to claim 3, wherein the first sealing member has a first through hole which is located on the first sealing member at a position corresponding to the operation window;

the second sealing member has a second through hole which is located on the second sealing member at a position corresponding to the operation window;

the cover plate is configured to cover the second through hole.

5. The operation box according to claim 3, wherein the operation box further comprises:

a fixing member for fixing the first sealing member on the outer surface of the side wall and for unfixing the first sealing member from the outer surface of the side wall.

6. The operation box according to claim 5, wherein the fixing member is a screw, the screw is configured to fix the first sealing member on the outer surface of the side wall by a tightening manner and release the first sealing member fixed on the side wall by an unscrewing manner.

7. The operation box according to claim 5, wherein the fixing member is a first spring buckle, one end portion of the first spring buckle is fixed on the outer surface of the side wall, the other end portion of the first spring buckle has a first sprocket, the first spring buckle is configured to withhold the first seal member by the first sprocket so that the first sealing member is fixed on the outer surface of the side wall, the first spring buckle is further configured to release a buckling state between the first spring buckle and the first seal member with the first sprocket, for releasing the first sealing member from being fixed on the side wall.

8. The operation box according to claim 3, wherein a sealing element is disposed on the main cover plate or the second sealing member;

a first latching portion is disposed on the latching member, a second latching portion is disposed on the second sealing member, a position where the first latching portion is located on the latching member corresponds to a position where the second latching portion is located on the second sealing member;

the first latching portion is configured to latch the second latching portion mutually and makes the main cover plate and the second sealing member jointly squeeze the sealing element for sealing the chamber.

9. The operation box according to claim 8, wherein the latching member is a sub cover plate, the first latching portion is a locking wing, and the second latching portion is a locking recess;

the locking wing is configured to embed into the locking recess, and wherein a embedding opening is disposed on a second surface of the second sealing member and corresponds to the locking wing, the embedding opening is throughout the locking recess;

the locking wing is configured to embed into the locking recess by the embedding opening, the locking recess is used for accommodating the locking wing;

the latching member rotates a predetermined angle along a first direction or a direction opposite the first direction after embedding into the locking recess so that the locking wing and the locking recess mutually lock;

the latching member further rotates the predetermined angle along the first direction or the direction opposite the first direction for unlocking the locking wing and the locking recess.

10. The operation box according to claim 8, wherein the first latching portion is a second spring buckle or a second spring buckle recess, the second latching portion is the second spring buckle recess or the second spring buckle, the cover plate and the second sealing member are configured to seal the operation window by the second spring buckle and the second spring buckle recess mutually buckling;

the second spring buckle or a second spring buckle recess on the cover plate and the second spring buckle recess or the second spring buckle of the second sealing member are further used for unlocking so that the cover plate and the second sealing member are separated from each other for releasing the operation window from sealing.

11. The operation box according to claim 8, wherein a recess is disposed on the main cover plate or the second sealing member and used for accommodating and fixing the sealing element.

12. The operation box according to claim 8, wherein the cover plate further comprises a gripping member which is disposed on the sub cover plate.

13. The operation box according to claim 8, wherein the cover plate further comprises a connecting member which is used for connecting the main cover plate with the latching member.

14. A method for replacing a glove of an operation box according to claim 4, comprising the following steps of:

using the cover plate and the second sealing member to jointly seal the operation window;

unlocking the first sealing member from the outer surface of the side wall so that the glove being removed from the side wall;

disposing a glove outlet edge portion of the other glove on the outer surface of the side wall;

fixing the first sealing member on the outer surface of the side wall for sealing the glove outlet edge portion of the other glove and the side wall;

releasing the operation window from sealing of the cover plate and the second sealing member.

15. The method for replacing the glove of the operation box according to claim 14, wherein the step of using the cover plate and the second sealing member to jointly seal the operation window comprises:

moving the cover plate to the operation window by the glove body, wherein the cover plate is located in the chamber;

using the cover plate for covering the second sealing member, wherein the latching member of the cover plate is disposed toward the operation window;

latching the first latching portion of the latching member with the second latching portion of the second sealing member so that the main cover plate and the second sealing member jointly squeeze the sealing element for sealing the chamber.

16. The method for replacing the glove of the operation box according to claim 15, wherein after the step of latching the first latching portion of the latching member with the second latching portion of the second sealing member, and before the step of unfixing the first sealing member from the outer surface of the side wall, the method further comprises the following step of:

removing the glove body from the operation window.

17. The method for replacing the glove of the operation box according to claim 14, wherein the step of releasing the operation window from sealing of the cover plate and the second sealing member comprises:

releasing a latching of the first latching portion of the latching member and the second latching portion of the second sealing member by the glove body of the other glove;

disposing the cover plate in the chamber by the glove body of the other glove.

18. The method for replacing the glove of the operation box according to claim 17, wherein after the step of fixing the first sealing member on the outer surface of the side wall, and before the step of releasing the latching of the first latching portion of the latching member and the second latching portion of the second sealing member by the glove body of the other glove, the method further comprises the following steps:

moving the glove body of the other glove to the operation window.

* * * * *